June 12, 1923.
J. STENGER
AIR HOSE COUPLING
Filed June 25, 1921    2 Sheets-Sheet 1
1,458,862
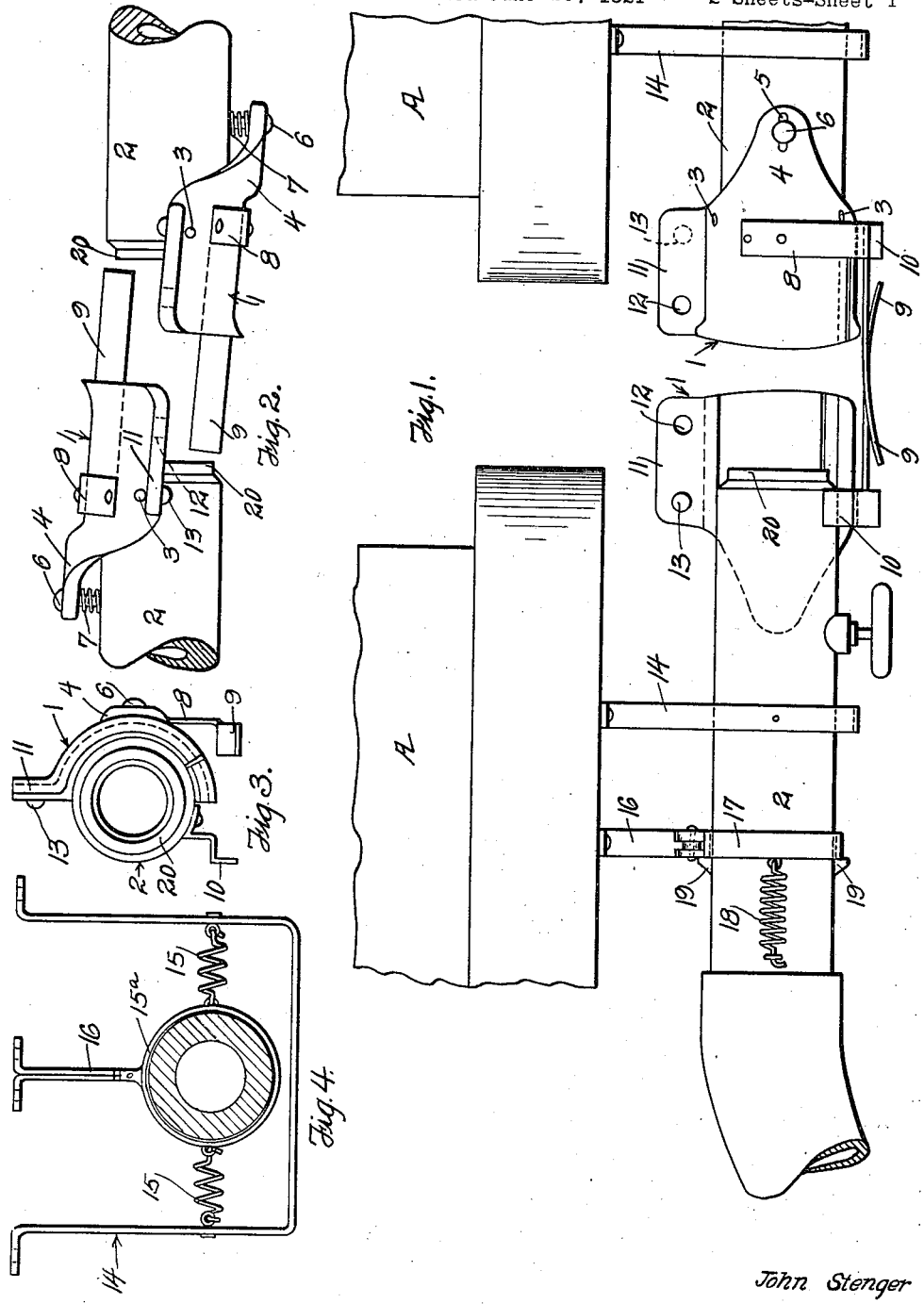
John Stenger
INVENTOR
BY Victor J. Evans
ATTORNEY June 12, 1923.

J. STENGER

AIR HOSE COUPLING

Filed June 25, 1921

John Stenger,
INVENTOR

BY Victor J. Evans
ATTORNEY

Patented June 12, 1923.

1,458,862

UNITED STATES PATENT OFFICE.

JOHN STENGER, OF McKEESPORT, PENNSYLVANIA.

AIR-HOSE COUPLING.

Application filed June 25, 1921. Serial No. 480,399.

*To all whom it may concern:*

Be it known that I, JOHN STENGER, a citizen of the United States, residing at McKeesport, in the county of Allegheny and State of Pennsylvania, have invented new and useful Improvements in Air-Hose Couplings, of which the following is a specification.

This invention relates to coupling devices, and more particularly to an air hose coupling especially adapted for use on railway trains and for similar purposes.

One of the main objects of the invention is to provide a coupling of the character stated by means of which the air hose is automatically connected or coupled when the cars are moved toward each other. A further object is to provide a coupler of simple construction and operation which may be readily applied to a hose of standard construction. Further objects will appear from the detailed description.

In the drawings:—

Figure 1 is a side view of a coupling constructed in accordance with my invention as applied;

Figure 2 is a top plan view of the coupling;

Figure 3 is an end view of one of the coupling members;

Figure 4 is a detail of the supporting means for the coupling pipe;

Figure 5:
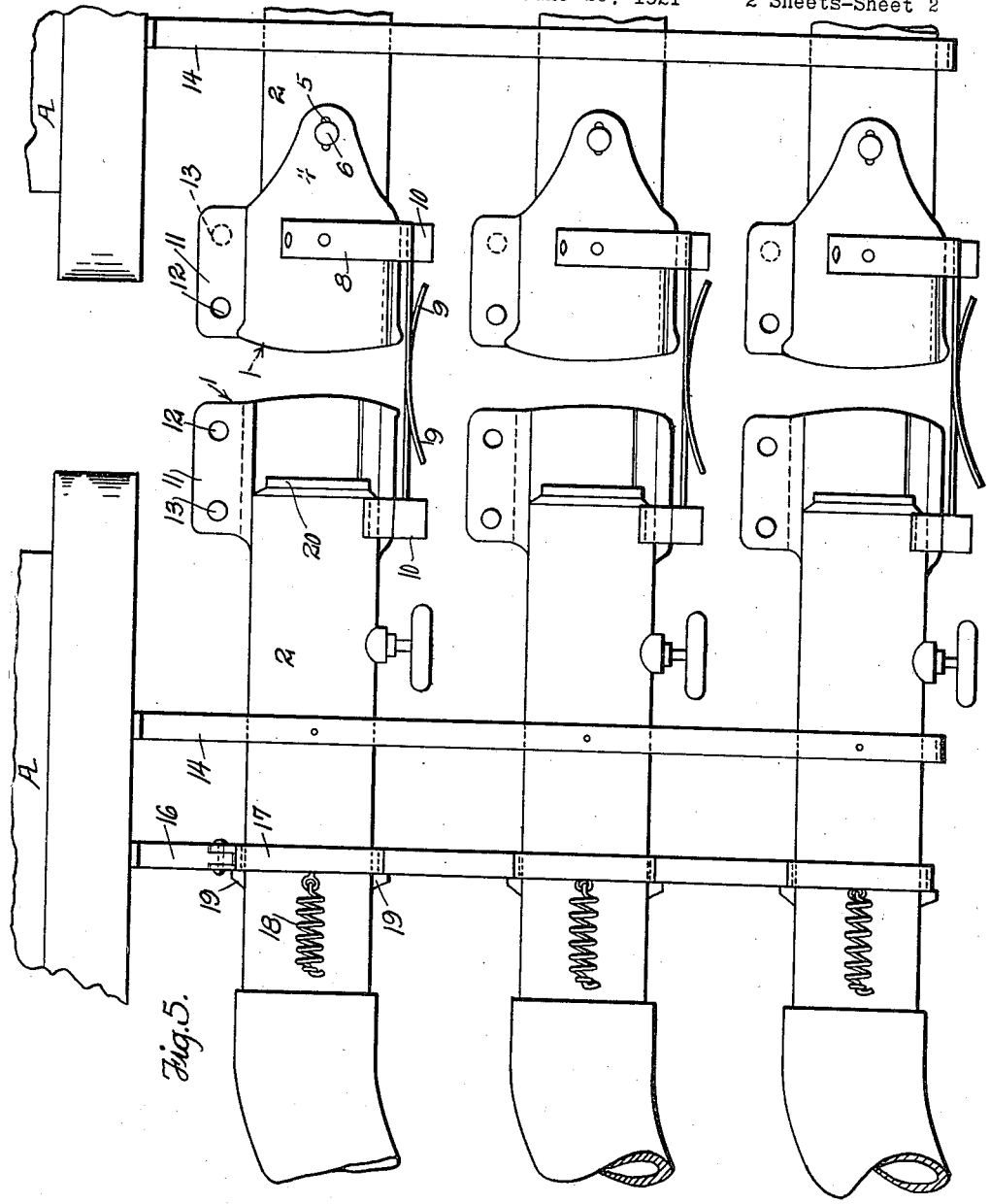
Figure 5 is a side view showing a plurality of the couplers as applied to passenger cars.

The coupling includes two coupling members or plates 1 of concavo-convex cross-section which, in practice, are oppositely related. Each of these members is adapted to fit about the end portion of an air tube or pipe 2 and is pivotally secured to the pipe for rocking movement about a vertical axis by means of rivets or pins 3. Member 1 is provided, at its inner end, with an inwardly projecting offset finger 4 provided with a slot 5 which receives a headed pin 6 secured in pipe 2. An expansion spring 7 is mounted about the shank of the pin and is confined between finger 4 and pipe 2, this spring acting to force the outer portion of member 1 inwardly toward the outer end of pipe 2. Each member 1 is further provided with a resilient bracket 8 secured thereto, from the lower end of which projects a flat arm 9 adapted for contact with an angular member 10 secured to the pipe 11 upon which is mounted the other member 1. Each member 1 is further provided with a vertically projecting flange 11, this flange being provided adjacent to its outer end with an opening 12 adapted for reception of a rounded stud 13 projecting from the inner face of the flange of the other member.

Pipe 2 is held positioned centrally of a U-frame 14 depending from the bottom of car A by means of coil springs 15 secured to a ring 15$^a$ fastened about the pipe and to the arms of the frame. A bracket 16 depends from car A inside of frame 14, and is pivoted at its lower end to a collar or ring 17 through which the pipe 2 is slidable, the pipe being normally held projected by tension springs 18 secured to the pipe and to ring 17. Outward movement of pipe 2 through ring 17 is positively limited by lugs 19 formed on the pipe which contact with the inner edge of the ring. This provides a spring suspension for pipe 2 which permits sufficient movement of the pipe of one car to assure proper aligning thereof with the pipe of the adjacent car. In practice, as one of the cars A is moved into coupling position relative to the other car, the guide arms 9 of members 1 contact with the angle members 10 so as to insure proper aligning of the coupling members. The members 10 and arms 9 also limit outward movement of the coupling members laterally of the cars A, the outer ends of these members being rocked outwardly slightly during the coupling operation so as to place the springs 7 under compression. Each of the pipes 2 is provided in its outer end with a packing ring 20 of rubber or other suitable material and when these rings are pressed tightly against each other so as to effect a fluid tight closure the studs 13 fit into openings 12 thus securing the coupling members together, these members when in interlocked relation forming a cylindrical casing which extends about the adjacent end portions of pipes 2. This provides simple and efficient means for coupling together the sections of the air line, and effectually prevents leakage. The spring suspension of the pipes 2 permit sufficient movement of these pipes to prevent accidental opening of the coupling. The coupling may be opened by uncoupling the cars and pulling them apart thus pulling the rounded studs 3 out of openings 12, the coupling members 1 being forced outward laterally of the cars a slight distance during this uncoupling operation.

In Figure 5 I have illustrated the coupling as applied to passenger cars, in which case each car is provided with a set of three coupling members, the construction and operation of these members being similar to the coupling illustrated and described above which is adapted more particularly for use in connection with freight cars.

What I claim is:—

1. In a coupling, in combination with two aligned pipe sections, coupling members rockably mounted on the adjacent ends of the pipe sections and each adapted to enclose one half of the end portion of the other pipe section, means for forcing the outer end portions of said members toward each other, and means for detachably securing said members in coupled relation.

2. In a coupling, in combination with two alined pipe sections, opposed coupling members rockably mounted intermediate their ends on said sections and projecting beyond the same, means for forcing the inner ends of said members away from the pipe sections, and means for detachably securing said members in coupled relation.

3. In coupling means, two alined pipe sections, coupling members of substantially semi-cylindrical cross-section rockably mounted intermediate their ends on said sections and projecting beyond the same, means for forcing the inner ends of said members away from the pipe sections, and means for detachably securing the coupling members in coupled relation.

4. In coupling means, two alined pipe sections, opposed coupling members of substantially semi-cylindrical cross-section rockably mounted intermediate their ends on said sections and projecting beyond the same, means for moving said members into substantial parallelism upon movement of the pipe sections toward each other, means for forcing the inner ends of the members away from the pipe sections, and means for detachably securing said members in coupled relation.

5. In coupling means, two alined pipe sections, opposed coupling members rockably mounted intermediate their ends on said sections and projecting beyond the same, and means for forcing the inner ends of said members away from the pipe sections, the coupling members being provided with means held in engagement by the pressure of the outer portions of said members toward each other for detachably securing the coupling members together.

6. In coupling means, two alined pipe sections, opposed coupling members rockably mounted intermediate their ends on said sections and each provided at one edge with an upwardly projecting flange having an inwardly directed stud and an opening positioned for reception of the stud of the other member, and means for forcing the inner ends of the coupling members away from the pipe sections.

In testimony whereof I affix my signature.

JOHN STENGER.